Oct. 6, 1953  R. J. SCHMID  2,654,320
SEVERABLE AIRCRAFT
Filed March 7, 1949  3 Sheets-Sheet 1
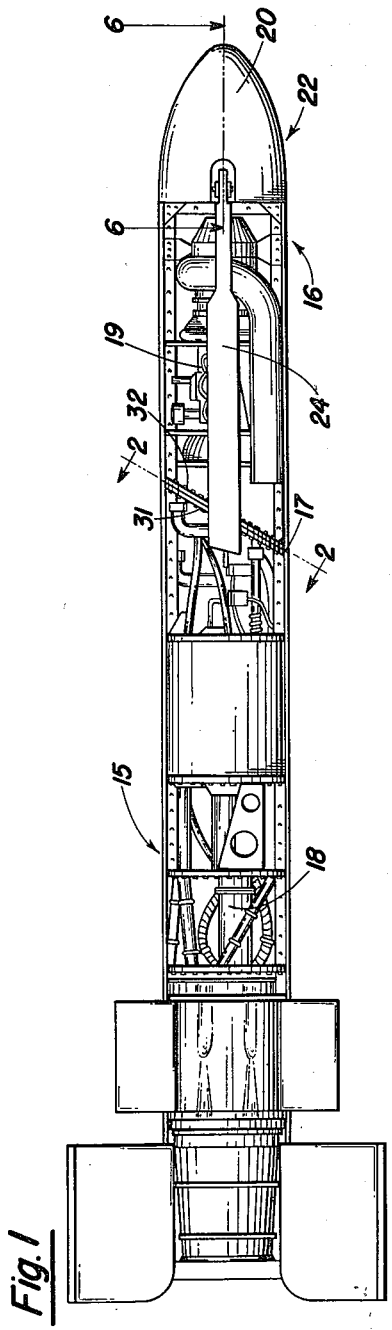
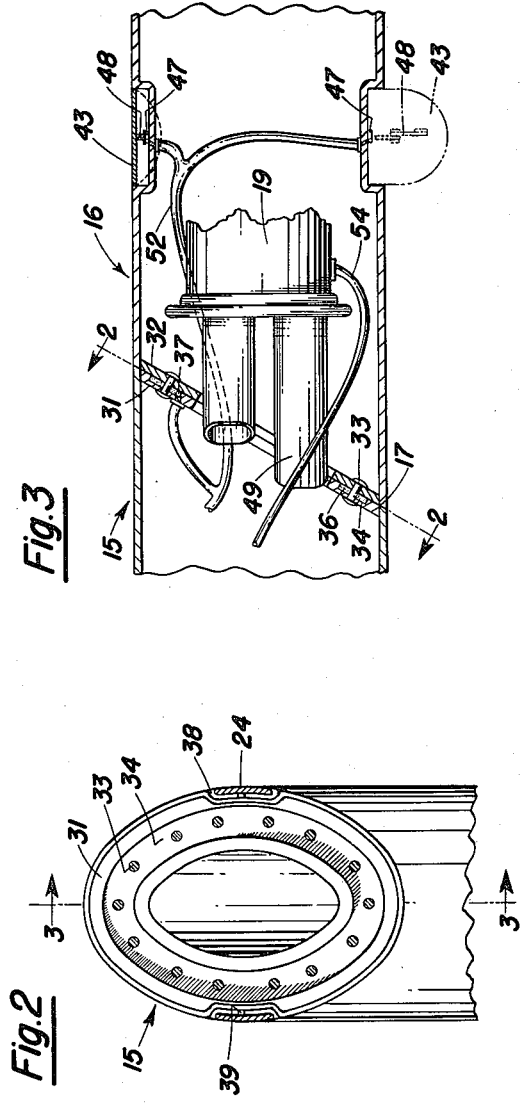
INVENTOR.
*Roy J. Schmid*
BY *M. A. Hayes*
*Attorney*

Oct. 6, 1953 — R. J. SCHMID — 2,654,320
SEVERABLE AIRCRAFT
Filed March 7, 1949 — 3 Sheets-Sheet 2
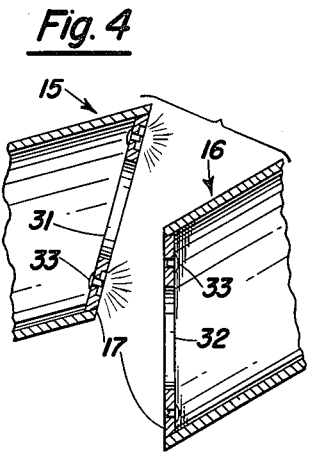
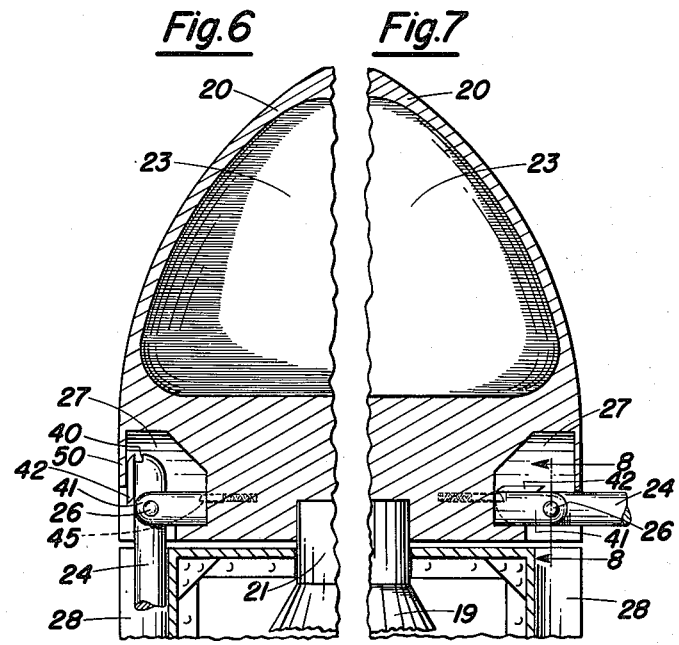
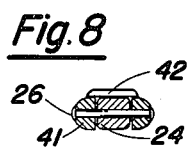
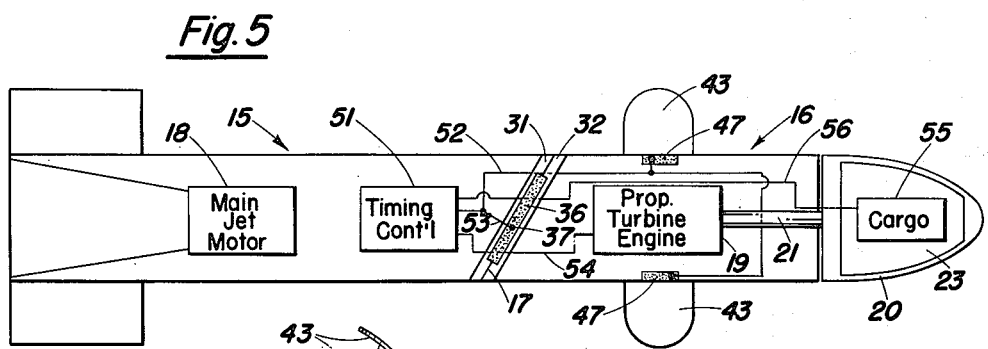
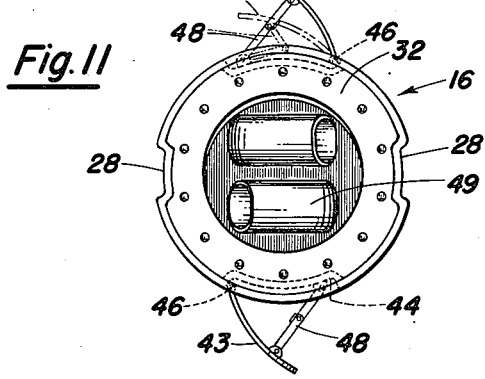
INVENTOR.
Roy J. Schmid
BY
Attorney Oct. 6, 1953          R. J. SCHMID                2,654,320
                    SEVERABLE AIRCRAFT
Filed March 7, 1949                          3 Sheets-Sheet 3

INVENTOR.
Roy J. Schmid
BY
M. A. Hayes
Attorney

Patented Oct. 6, 1953

2,654,320

UNITED STATES PATENT OFFICE 2,654,320

SEVERABLE AIRCRAFT

Roy J. Schmid, Camp Cooke, Calif.

Application March 7, 1949, Serial No. 80,053

11 Claims. (Cl. 102—49)

(Granted under Title 35, U. S. Code (1952), sec. 266)

This invention may be manufactured and used by or for the Government for governmental purposes without the payment to me of any royalty thereon.

This invention relates to a severable craft, especially to a severable aircraft, in which the bow portion, after being severed from the stern portion of the aircraft, drops slowly to the ground stern-first, the descent being checked by means of a helicopter propeller.

It is an object of this invention to provide a craft which may be broken in two, or sundered, during its transit.

More specifically, it is an object of this invention to provide an aircraft, such as a rocket, with means for severing the bow portion and allowing it to drop slowly to earth, while the body or stern portion of the craft is discarded to plummet downward freely.

It is another object of this invention to provide an aircraft with an auxiliary set of helicopter propellers, which allow the aircraft to drop slowly to earth after it has arrived at a predetermined point.

It is another object of this invention to provide an aircraft, or rocket, which will have propulsion means for shooting it into the air, and a helicopter propeller for allowing the aircraft to drop gently to earth, the action of the propeller being to check the descent of the drop.

It is another object of this invention to provide explosive means for severing an aircraft in flight, whereby the two separated portions may go their individual ways after being sundered.

Other objects and many of the attendant advantages of this invention will be readily appreciated as the same becomes better understood by reference to the following description.

In accordance with the instant invention, the aircraft is composed of a stern portion and a bow portion detachably secured together. Propulsion means, preferably jet propulsion means, such as a rocket motor, are mounted in the stern portion for propelling the aircraft through the air. A propeller is rotatably mounted at the nose of the bow portion, the blades of the propeller being retractable into, or against, the body of the bow portion, and being movable outwardly into operative position from the bow portion as the latter drops stern down. It is preferred to achieve retractability of the blades by making them foldable into elongate recesses on the sides of the bow portion of the aircraft. A motor, preferably of the prop turbine type, is mounted in the bow portion, the shaft of the the motor being connected to the propeller to rotate it in helicopter fashion.

Explosive means are disposed at the juncture of the two portions, so that when the explosive means is detonated, the two portions are sundered; the stern portion is allowed to plummet to earth at will, while the bow portion, being heavier at its stern, pivots so that its stern points downward. Simultaneously with the sundering of the aircraft, the propeller motor is started, so that the propeller blades, which are mounted so as to be thrown outwardly into operative position by the explosion, begin to rotate and check the descent of the bow portion, which is thus allowed to drop gently to earth.

In order to counteract the tendency of the bow portion to rotate, due to the rotation of the propeller, stabilizing fins are foldably mounted on the sides of the bow portion, and are hinged outwardly with the sundering of the body into operative position where they tend to prevent the body from rotating. In addition, the exhaust from the prop turbine motor is directed through the stern of the bow portion downwardly and tangentially, so that its thrust not only aids the propeller in checking the descent of the bow portion, but the tangential component is directed so as to counteract the torque caused by the propeller, thereby maintaining the body substantially stable as it drops to earth.

In the normal flight of the complete aircraft, the blades of the propeller are maintained in inoperative position folded at the sides of the bow portion, by suitable securing means, which means is released, or fractured, by the explosion. The explosion goes even farther and tends to throw the propeller blades outward into operative position. As the propeller blades unfold fully to a position normal with the bow portion, suitable latch means lock them in extended position. The dropping of the bow portion stern down also tends to maintain the propeller blades outward of the body.

The explosive means for sundering the aircraft at the juncture of the bow and stern portions preferably assumes the form of a pair of abutting rings secured together by a plurality of rivets or pins. One ring is mounted in each of the portions. An annular groove is provided in one ring which is filled with explosive, such as powder. When the powder is detonated, the pins are fractured, throwing the two portions apart. The juncture between the two portions of the aircraft is preferably disposed obliquely with respect to the axis of the craft, so that the explosion tends to throw the two portions laterally apart from each other, and thereby pushes the stern of the bow portion downward, which position it continues to assume as it drops to earth.

In accordance with the general description of the instant invention set forth immediately above, there will now be described a particular embodiment of the invention, as illustrated in the accompanying drawings, wherein:

Fig. 1 is a longitudinal view, partially cross-sectioned to show the interior of the aircraft;

Fig. 2 is a cross-sectional view taken along the oblique juncture between the two portions of the aircraft, as shown by the arrows 2—2 in Figs. 1 and 3;

Fig. 3 is a fragmentary section taken along the line 2—2 in Fig. 2;

Fig. 4 is a fragmentary view of the parts illustrated in Fig. 3, showing the juncture of the two bodies immediately after the sundering explosion;

Fig. 5 is a schematic diagram showing the interrelating connection between the parts of the aircraft;

Fig. 6 is a fragmentary section at the nose of the bow portion of the aircraft showing a propeller blade in recessed position;

Fig. 7 is a view similar to Fig. 6, showing a propeller blade unfolded outwardly and latched in operative position;

Fig. 8 is a fragmentary section taken on line 8—8 in Fig. 7;

Fig. 11 is an under or stern view of the bow portion taken along line 11—11 in Fig. 10.

Figure 9:
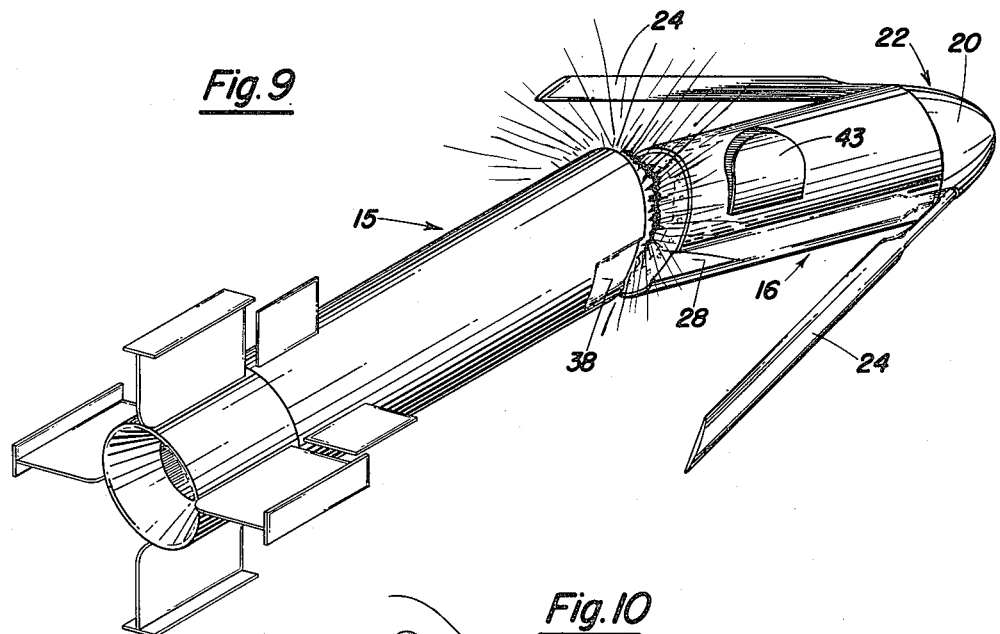
Fig. 9 is a perspective view illustrating the sundering action of the explosive charge placed at the junction of the two portions of the aircraft.

Referring to Fig. 1, the severable aircraft is shown comprising a stern portion 15 and a bow portion 16 detachably secured together at a juncture 17 disposed in a plane oblique to the axis of the aircraft. The aircraft is provided with jet propulsion means such as a rocket motor 18 mounted in the stern portion 15, which serves to propel the complete craft through the air. Another motor 19, preferably of the prop turbine type, is mounted in the bow portion 16. The shaft 21 (Fig. 6) of the motor 19 is connected to a propeller 22 at the nose of the bow portion 16. The hub 20 of the propeller 22 is hollow, as shown at 23, for the reception of any desired cargo such as measuring instruments or a war head. The propeller 22 is provided with a pair of diametrically spaced blades 24 that are made foldable against the sides of the aircraft by being hinged to the hub 20, each through the medium of a pin 26 spanning a yoke 41 secured to the hub 20 within a recess 27 formed at the rear of the hub. An elongate indentation or recess 28 is provided in the aircraft body for each propeller blade 24, so that as the propeller blades 24 are folded flat against the sides, they enter into the recesses and form a flush, streamlined surface.

During the initial stage of flight, the propeller blades 24 are folded or retracted to inoperative position as shown in Figs. 1 and 6. At a predetermined time in the flight of the craft, the bow portion 16 is sundered from the stern portion 15, and the propeller blades 24 are projected forwardly into operative position, where they are rotated by the motor 19 in helicopter fashion to check the descent of the bow portion, which, after severance, has swung stern down, by virtue of having its center of gravity located near its stern. The propeller 20 thus checks the descent of the severed bow.

The sundering means is shown particularly in Figs. 2, 3, and 4, and consists of a pair of abutting rings 31 and 32, disposed obliquely with respect to the axis of the craft, and secured to the respective abutting portions of the stern and bow portions 15 and 16, respectively. The two rings, 31 and 32, are in turn secured together, thus uniting the portions 15 and 16, by a plurality of rivets or pins 33, extending through the two rings and spaced around the entire length thereof, as shown in Fig. 2. One of the rings, 31 for example, is provided with a groove therearound adjacent the other ring, thus forming an annular cavity 34 which is filled with explosive material such as powder 36.

Upon detonation of the powder 36 by any suitable means such as an electric squib 37, the two rings 31 and 32 are blown apart, as shown in Fig. 4, fracturing the securing pins 33, and sundering the two portions 15 and 16 of the aircraft. As best seen in Fig. 4, the oblique disposition of the juncture 17, consisting of the rings 31 and 32, results in the explosion forcing the stern end of the bow portion 16 downward, thereby accelerating its assumption of the stern-down dropping position, which it is to assume as it descends to earth, as shown in Fig. 9. The explosion also tends to tip the forward end of the stern portion slightly upward, so that it more readily clears the sundered bow portion, and does not interfere with proper operation of the apparatus.

It will be noted in Fig. 1 that the tip end of each propeller blade 24, when retracted, extends slightly behind the juncture 17, so as to overlap partially the stern portion 15 of the aircraft. This necessitates an extension of the groove or recess 28 into the stern portion, as shown at 38 in Fig. 2. It also makes possible the temporary securing of the tips of the propeller blades 24 to the sides of the aircraft, by means of fracturable welds or pins 39, connecting the tip of the blade 24 to the front end of the stern portion 15. With the explosive separation of the two portions, the securing means 39 readily fractures and allows the propeller blades 24 to swing rapidly outward. This outward swinging of the propeller blades 24 is given considerable impetus by the explosion of the powder 36, the force of which, of necessity, is directed somewhat outwardly, to blast the propeller blades away from the body of the bow portion 16. Continued outward forcing of the blades 24 results naturally from the stern-down dropping of the bow portion 16. A third force tending to extend the blades is the rotation of the hub 20 by the motor 19, which is started in synchronism with the explosion. As each propeller blade 24 swings into fully extended or operative position, its short nose 40 (Fig. 6) adjacent the hinge pin 26 snaps in under a spring-pressed latch 45, which serves to hold the propeller blade 24 in operative or extended position in a plane substantially normal to the axis of the aircraft, as shown in Fig. 7.

A flange 42 extending from each side of the nose 40 serves as an extending limit by abutting the yoke 41 (Figs. 7 and 8). This flange and the nose 40 reside immediately under a lip portion 50 partially closing the recess 27 from the front (Fig. 6).

Figure 10:
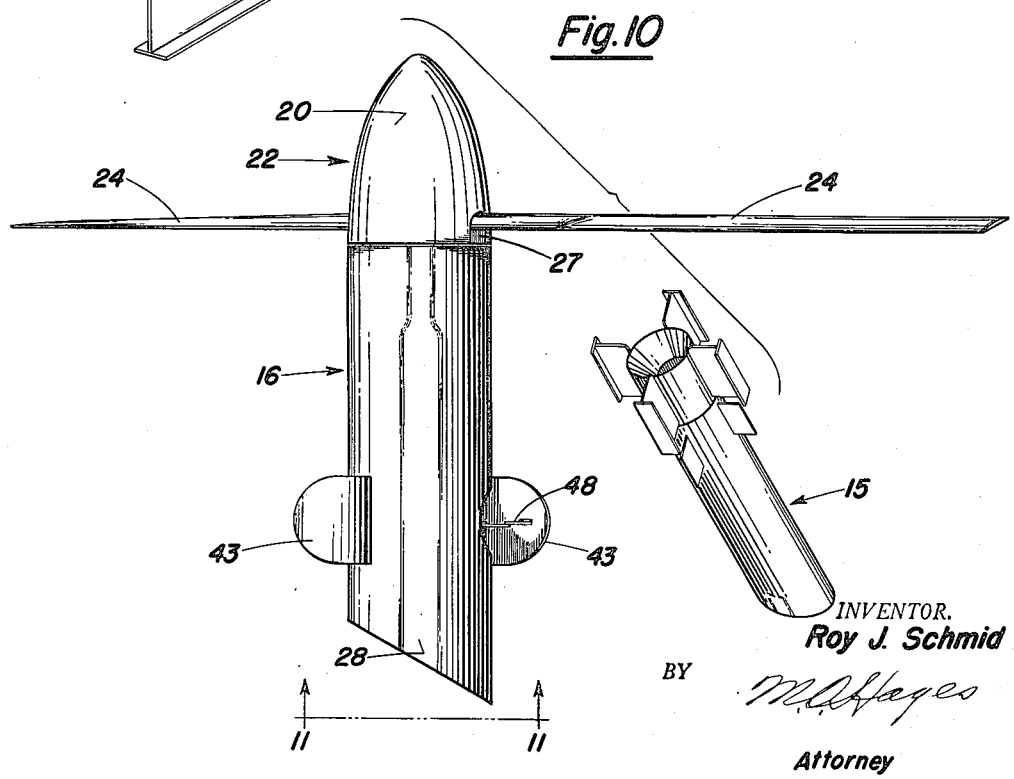
Fig. 10 is a view showing the bow portion of the aircraft dropping to earth with the descent being checked by the rotation of the helicopter propeller.

To counteract the tendency of the bow portion 16 to rotate, caused by the rotation of the propeller 22, a pair of stabilizing fins 43 (Fig. 10) are retractably mounted in recesses 44 in the bow portion 16, preferably being hinged at 46, and being thrown outwardly by a small explosive squib 47 (Fig. 3) detonated simultaneously with the sundering of the aircraft. An over-center, folded arm 48 serves to maintain the fins 43 in extended position after they have been thrown outwardly. To further counteract the turning tendency of the bow portion 16, the exhaust from the prop turbine motor 19 is directed sternwardly and tangentially, as shown at 49 in Fig. 11, the tangential components of the jet force thus produced being in a direction to counteract the rotative tendency of the body 16, due to the propeller 22. The downward thrust component from the exhaust jet 49 also assists the helicopter propeller 22 to check the descent of the bow portion as it drops, as shown in Fig. 10.

The entire cycle of the flight of the aircraft may be controlled by a system shown schematically in Fig. 5. In the principal body or stern portion 15 of the aircraft, a timing or master control 51 is mounted. Suitable connections, such as electrical connections 52 and 53, are made to the explosive means 47 and 36, as shown, so that at a predetermined time, or upon reception of a predetermined signal, the powder 36 is ignited to sunder the aircraft, and the squib 47 is simultaneously ignited to throw the fins 43 outwardly into operative position on the bow portion 16. Synchronously therewith the prop turbine motor 19 is set into operation by a suitable electrical connection 54, thereby causing the shaft 21 to turn the propeller 22, the propeller blades 24 in the meantime having been severed from the sides of the stern portion 15 and thrown outwardly into operative position by the explosive force of the powder 36, which also sundered the aircraft.

*Operation*

Operation of the instant invention will now be summarized. The complete aircraft as illustrated in Fig. 1 is launched, in any suitable manner, and is propelled through the air by the motor 18. At a predetermined time, or upon reception of a predetermined signal, the control means 51 (Fig. 5) ignites the squib 37, which detonates the powder 36 in the cavity 34 disposed between the two rings 31 and 32, thereby blowing these rings apart and fracturing the rivets or pins 33. This sunders the two portions 15 and 16 of the aircraft, as shown in Fig. 9, the oblique disposition of the juncture 17 between the two portions serving to separate them more completely.

Simultaneously with the severing of the two portions, the squib 47 (Fig. 3) is detonated to throw the fins 43 outward, thereby tending to stabilize the bow portion 16 as it drops stern downward, as shown in Fig. 9. Also synchronously with the explosion, the prop turbine motor 19 is set into operation to rotate the propeller 22 and to cause the propeller blades 24, thrown outwardly into operative position (Fig. 7) by the explosion, to rotate in helicopter fashion as shown in Fig. 10, thereby checking the descent of the bow portion 16 and allowing it to drop gently to earth. The descent is also checked by the jet reaction of the exhaust from the exhaust vents 49 of the prop turbine motor 19, the tangential disposition of the exhaust vents 49 also serving to assist the stabilizing fins 43 in resisting the tendency of the bow portion 16 to rotate.

Instruments, or a war head, constituting the cargo 55 in the space 23 (Fig. 5) may be also set into operation with the sundering of the aircraft, by means of a suitable electrical connection 56, actuated by the timing control 51.

It will be noted that the ring-like character of the detachable securing means 31 and 32, uniting the two portions 15 and 16 of the aircraft, allows full and complete communication between the two portions while they are connected together in normal flight.

It will be readily appreciated that the instant invention embodies two concepts which might conceivably be employed separately, even though in combination they are uniquely efficacious to produce many desired results. These two features are (1) the retractable blades 24 of the helicopter propeller 22 in the nose of the aircraft, and (2) the severing means, particularly the explosive severing means, by means of which the stern portion 15 and the bow portion 16 may be separated. It is conceivable that either of these two features might be employed separately. For example, the propeller 22 might be employed without the sundering means by simply cutting off the main jet propulsion motor 18 and allowing the craft to swing stern downward, whereupon the helicopter propeller blades 24 could be actuated into operative position and rotated to check the descent of the aircraft. Similarly, the sundering feature (explosive 36), it is obvious, could be used independently, if desired, without the helicopter propeller feature, and it is adaptable to water craft as well as aircraft.

Despite the susceptibility of these two features to independent use, it will be readily apparent that their combination in a common aircraft lends itself to many advantages, the principal being the use of the sundering explosion to stop the forward travel of the bow portion, to free the securing means holding the propeller blades at the side of the craft, and to blast the blades outwardly into operative position.

Obviously many modifications and variations of the present invention are possible in the light of the above teachings. It is therefore to be understood that within the scope of the appended claims the invention may be practiced otherwise than as specifically described.

What is claimed is:

1. A severable aircraft comprising a stern portion and a bow portion detachably secured together, jet propulsion means mounted in said stern portion for propelling said aircraft thru the air, a propeller rotatably mounted at the nose of said bow portion, the blades of said propeller being foldable against the sides of said bow portion and being movable into operative position out from said bow portion as the latter drops stern down, a motor in said bow portion connected to said propeller to rotate the same in helicopter fashion, the exhaust from said motor being directed sternwardly and tangentially so as to counteract the tendency of said bow portion to rotate due to the helicopter rotation of said propeller, securing means securing said blades against the sides of said bow portion, explosive means at the juncture of said portions effective upon detonation to sunder said aircraft at said juncture and release said securing means, means for detonating said explosive means whereby to allow said bow portion to drop stern down with said propeller and exhaust checking the drop, and latch means at the inner ends of said blades effective to secure said blades in extended operative position.

2. A severable aircraft comprising a stern portion and a bow portion detachably secured together, propulsion means mounted in said stern portion for propelling said aircraft thru the air, a propeller rotatably mounted at the nose of said bow portion, the blades of said propeller being foldable against the sides of said bow portion and being movable into operative position out from said bow portion as the latter drops stern down, a motor in said bow portion connected to said propeller to rotate the same in helicopter fashion, stabilizing fins on said bow portion, the exhaust from said motor being directed sternwardly and tangentially so as to counteract the tendency of said bow portion to rotate due to the helicopter rotation of said propeller, securing means securing said blades against the sides of said bow portion, explosive means at the juncture of said portions effective upon detonation to sunder said aircraft at said juncture and release said securing means, and means for detonating said explosive means whereby to allow said bow portion to drop stern down with said propeller and exhaust checking the drop.

3. A severable aircraft comprising a stern portion and a bow portion detachably secured together, propulsion means mounted in said stern portion for propelling said aircraft thru the air, a propeller rotatably mounted at the nose of said bow portion, the blades of said propeller being foldable against the sides of said bow portion and being movable into operative position out from said bow portion as the latter drops stern down, a motor in said bow portion connected to said propeller to rotate the same in helicopter fashion, the exhaust from said motor being directed sternwardly and tangentially so as to counteract the tendency of said bow portion to rotate due to the helicopter rotation of said propeller, explosive means at the juncture of said portions, and means for detonating said explosive means, thereby to sunder said aircraft at said juncture and allow said bow portion to drop stern down with said propeller and exhaust checking the drop.

4. A severable aircraft comprising a stern portion and a bow portion detachably secured together, propulsion means mounted in said stern portion for propelling said aircraft thru the air, a propeller rotatably mounted at the nose of said bow portion, the blades of said propeller being foldable against the sides of said bow portion and being movable into operative position out from said bow portion as the latter drops stern down, a motor in said bow portion connected to said propeller to rotate the same in helicopter fashion, stabilizing means on said bow portion to counteract the tendency of said bow portion to rotate due to the helicopter rotation of said propeller, explosive means at the juncture of said portions, and means for detonating said explosive means, thereby to sunder said aircraft at said juncture and allow said bow portion to drop stern down with said propeller checking the drop.

5. A severable aircraft comprising a stern portion and a bow portion detachably secured together, propulsion means mounted in said stern portion for propelling said aircraft thru the air, a propeller rotatably mounted at the nose of said bow portion, the blades of said propeller being foldable against the sides of said bow portion and being movable into operative position out from said bow portion as the latter drops stern down, a motor in said bow portion connected to said propeller to rotate the same in helicopter fashion, stabilizing means on said bow portion to counteract the tendency of said bow portion to rotate, explosive means at the juncture of said portions effective upon detonation to sunder said aircraft at said juncture, and means for detonating said explosive means to allow said bow portion to drop stern down with said propeller checking the drop.

6. A severable aircraft comprising a stern portion and a bow portion detachably secured together, propulsion means mounted in said stern portion for propelling said aircraft thru the air, a propeller rotatably mounted at the nose of said bow portion, the blades of said propeller being foldable against the sides of said bow portion and being movable into operative position out from said bow portion as the latter drops stern down, securing means securing said blades against the sides of said bow portion, stabilizing means on said bow portion to counteract the tendency of said bow portion to rotate, explosive means at the juncture of said portions effective upon detonation to sunder said aircraft at said juncture and release said securing means, and means for detonating said explosive means whereby to allow said bow portion to drop stern down with said propeller checking the drop.

7. A severable aircraft comprising a stern portion and a bow portion detachably secured together, propulsion means mounted in said stern portion for propelling said aircraft thru the air, a propeller rotatably mounted at the nose of said bow portion, the blades of said propeller being foldable against the sides of said bow portion and being movable into operative position out from said bow portion as the latter drops stern down, stabilizing means on said bow portion to counteract the tendency of said bow portion to rotate, explosive means at the juncture of said portions effective upon detonation to sunder said aircraft at said juncture, and means for detonating said explosive means to allow said bow portion to drop stern down with said propeller checking the drop.

8. Sundering apparatus comprising a pair of generally cylindrical bodies abutted coaxially together, a pair of abutting rings, one mounted in each body, a plurality of fracturable pins securing said rings together thereby to hold said bodies together, one of said rings having a groove therearound adjacent the other ring forming an annular cavity between the rings, and explosive material in said cavity.

9. Apparatus according to claim 8 wherein said rings are disposed obliquely with respect to the axis of said body.

10. Sundering apparatus comprising a pair of bodies abutted together, one of said bodies having a groove therein adjacent the other body forming a cavity between the bodies, explosive material in said cavity, and fracturable pin means passing thru said cavity and securing said bodies together.

11. A severable aircraft comprising a stern portion and a bow portion detachably secured together, propulsion means mounted in said stern portion for propelling said aircraft through the air, a propeller rotatably mounted at the nose of said bow portion, the blades of said propeller being foldable against the sides of said bow portion and being movable into operative position out from said bow portion as the latter drops stern down, a motor in said bow portion connected to said propeller to rotate the same in helicopter fashion, stabilizing means on said bow portion to counteract the tendency of said bow portion to rotate due to the helicopter rotation of said propeller, sundering means between said bow portion and said stern portion, explosive means at the juncture of said portions, and means for detonating said explosive means thereby to sunder said aircraft at said juncture and allow said bow portion to drop stern down with said propeller checking the drop, said sundering means comprising a pair of abutting rings, one mounted in each of said portions, a plurality of fracturable pins securing said rings together thereby to hold said portions together, one of said rings having a groove therearound adjacent the other ring forming an annular cavity between the said rings.

ROY J. SCHMID.

References Cited in the file of this patent

UNITED STATES PATENTS

| Number | Name | Date |
| --- | --- | --- |
| 1,880,579 | Tiling | Oct. 4, 1932 |
| 2,329,414 | Nelson | Sept. 14, 1943 |
| 2,338,322 | Ferrer | Jan. 4, 1944 |
| 2,402,716 | Whitsett | June 25, 1946 |

FOREIGN PATENTS

| Number | Country | Date |
| --- | --- | --- |
| 305,160 | Germany | Mar. 3, 1920 |
| 866,226 | France | Apr. 15, 1941 |